TRUNK GROUP PEG COUNT TOTALIZER

Filed May 25, 1964 2 Sheets-Sheet 1

INVENTOR
A. E. BACHELET
BY SE Hollander
ATTORNEY

June 6, 1967 A. E. BACHELET 3,324,241

TRUNK GROUP PEG COUNT TOTALIZER

Filed May 25, 1964 2 Sheets-Sheet 2

United States Patent Office 3,324,241
Patented June 6, 1967

3,324,241

TRUNK GROUP PEG COUNT TOTALIZER

Albert E. Bachelet, New York, N.Y., assignor to Bell Telephone Laboratories, Incorporated, New York, N.Y., a corporation of New York Filed May 25, 1964, Ser. No. 369,901
9 Claims. (Cl. 179—8)

ABSTRACT OF THE DISCLOSURE

Equipment is disclosed for counting with a single counter the operation of a number of telephone trunk circuits. Each such circuit is connected to an electronic delay network, the outputs of which are connected in common to the counter. Apparatus is included to detect simultaneous operating signals from any of the trunk circuits for causing the delay networks to deliver their respective outputs sequentially to the counter.

Figure 1:
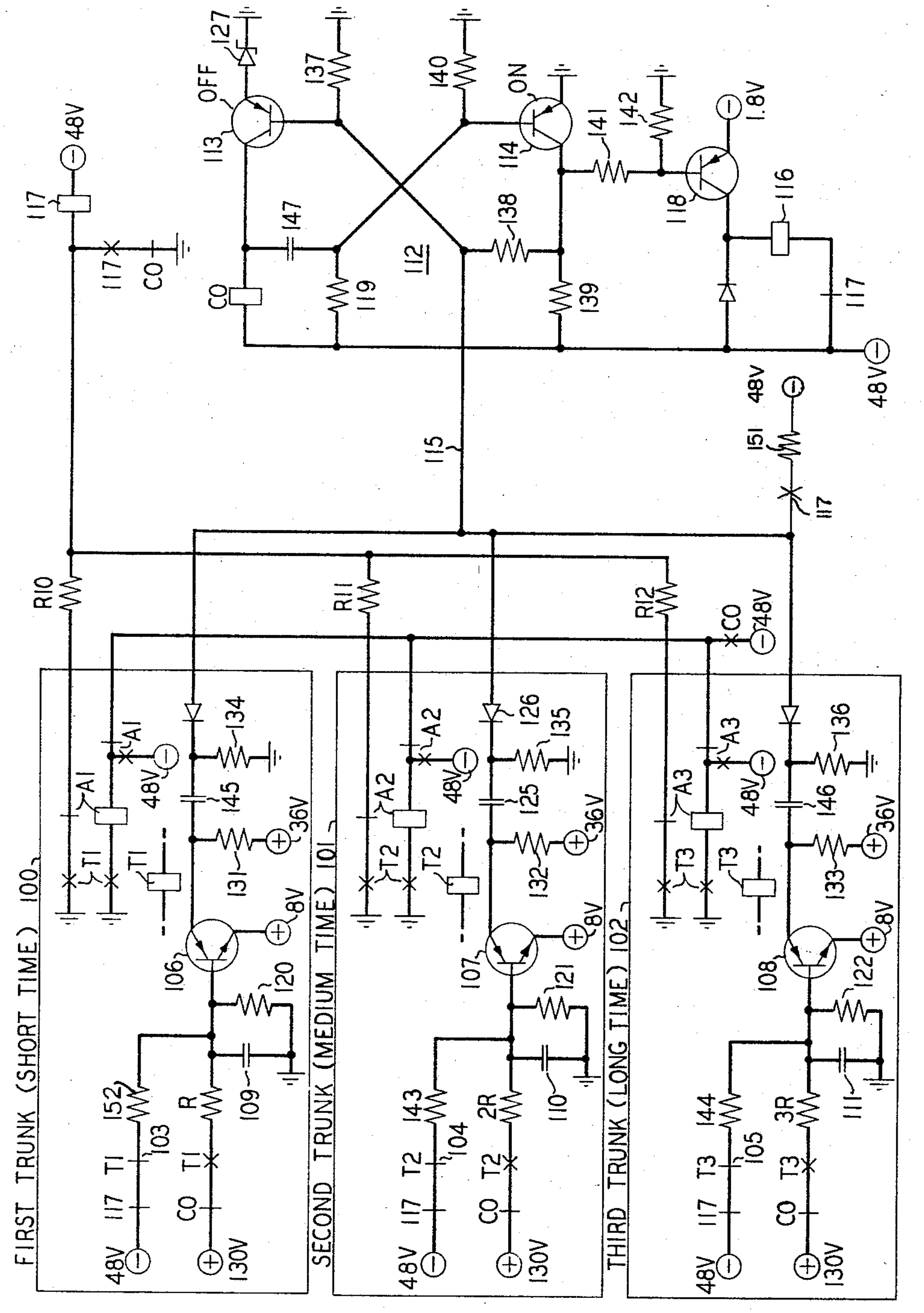

This invention relates to traffic observing facilities in telephone systems and more particularly to peg counters for indicating on a single counter the operation of a relatively large number of observed circuits.

As is well known in telephone practice, facilities are provided in almost all instances on a shared or common basis. Thus, for example, in a telephone central office, a relatively smaller number of incoming trunk circuits is utilized to provide access to a larger number of telephone station terminations in the office. In view of the "shared" nature of the trunk circuits by the relatively larger number of substation circuits, it is apparent that not all of the substation circuits may be served simultaneously by the trunk circuits. Instead, only a number of substation terminations equal to the number of trunk circuits may be simultaneously serviced.

It therefore becomes essential from the standpoint of evaluating the efficiency of loading or usage of the trunk circuits by the substation terminations to maintain records of the number of usages of the trunk circuits over particular periods. In accordance with the information thus developed, studies may be instituted to determine if the number of trunk circuits should be enlarged because of excessive loading thereby providing efficient matching of peak circuit demands with the number of available incoming trunk circuits.

Certain prior arrangements which were directed to providing a totalizing or counting operation by using a single register or counter to record usages of a plural number of circuits, although completely operative and useful, exhibited a disadvantage which related to the possibility of the "masking" or "loss" of trunk circuit utilizations in a situation in which the counting circuit was required to respond to simultaneous or concurrent trunk circuit usages. Thus, under conditions where a counter was active in recording the operation of a trunk circuit and during the time of the counting sequence, a second trunk circuit is energized, certain counters were unequipped to respond to the later operation. Similarly, in a case where such a counter responds to two identical and simultaneously occurring trunk utilizations, it records only a single usage since it receives, in effect, only one signal. Thus in both instances, at least one of the plural trunk utilizations is masked and lost.

It is therefore an object of this invention to provide for the totalizing of equipment usages wherein a single register is adapted to record the activity of a relatively large number of circuits or devices.

Still another object of this invention is to provide for the accurate recordation of equipment operations wherein a single register or counter is adapted to record the activity of a relatively large number of circuits under conditions where precisely simultaneous operations may occur.

Still another object of this invention is to provide for the sequential recording of the operation of a relatively large number of circuits to be observed wherein the circuits may be actuated concurrently although not precisely simultaneously.

These and other objects and features of the invention are achieved in a specific illustrative embodiment in which an individual timing circuit including a capacitor delay element and an assocated lock-in transistor "memory" is provided for each illustrative trunk circuit to be observed. Arrangements are provided to insure that the delay time for each timing circuit is different. For example, if three circuits are to be observed, the time constant or delay for each of the associated delay circuits may illustratively be a short time, a medium time, and a long time. In response to the precisely simultaneous actuation of all three circuits, the time delay element having the shortest time constant will be the first to achieve a sufficient voltage level to energize the associated transistor and deliver an output pulse to the counting equipment for ultimately actuating the register.

Additional facilities in the counting equipment on receipt of the output pulse from the shortest time delay circuit are operative to reset the medium time delay and long time delay elements. Thus, after the actuation of the counter in response to the output pulse from the shortest time delay circuit, the remaining two time delay circuits initiate an entirely new timing cycle.

Since the medium time delay circuit will achieve the requisite level first, the associated transistor memory element will deliver an output pulse to the counting circuit which, in the manner already described, will actuate the register and recycle the remaining (long) time delay circuit. The latter, after the elapse of the appropriate time, will energize its own transistor element and in turn deliver an output pulse to the counting unit for registration.

In short, although precisely simultaneous operation of the respective trunk circuits being observed was encountered, the associated timing circuits have delivered sequential outputs to the counting circuits—one for each observed circuit. Moreover, it is apparent that none of the desired output pulses was masked or lost.

Additional safeguards have been included in the present arrangement which further insure against the masking or loss of output pulses indicative of circuit operations in a situation similar to that described above where, for example, the second trunk circuit to be observed is energized and the associated "medium" time delay circuit has been activated. If the short time delay circuit is subsequently energized during the cycle time of the medium delay circuit, it is conceivable from the random nature of the operation that the short time delay circuit and medium time delay circuit may achieve their respective voltage levels substantially simultaneously and, as a result, deliver two distinct output pulses to the counter circuit. However, since the pulses are delivered in parallel to a single counting circuit, the latter "sees" only a single input and, in consequence, although two circuits have been energized, a single count is made.

To prevent this type of error, additional facilities are included which respond to the plural operation of a number of circuits to be observed where such circuits are operated simultaneously or concurrently. As a result, if the circuit associated with the medium time delay element has been actuated and, thereafter, during the cycle time of the medium time delay element the circuit associated with the short time delay element is energized, an arrangement which detects the plural circuit operation is effective to recycle both timing elements. Thus, neither the medium time delay circuit nor the short time delay circuit is permitted to continue the timing function. Instead, both time delay circuits are returned simultaneously to the initiation of their respective cycles. In view of the disparity between the cycle time of the short time delay circuit and the medium time delay circuit, it is apparent that the short time delay circuit (in view of the simultaneous re-energization of both time delay circuits) will be activated first. Under these conditions, the operation is similar to that described earlier where precisely simultaneous operation of the circuits to be observed is encountered with the resultant sequential recording of each circuit.

It is significant to note in the latter illustration that although both circuits to be observed have not operated simultaneously but, instead, concurrently, the respective time delay elements are recycled in a manner which simulates the simultaneous operation of both circuits. Moreover, it is apparent from the illustration that although the circuit associated with the medium time delay element was activated first, that the circuit which would initially counted and recorded is that associated with the short time delay element.

A feature of this invention includes a plurality of time delay elements associated individually with circuits to be observed wherein the respective time delay of each element differs from the others.

Another feature of this invention includes facilities responsive to the simultaneous operation of a plurality of trunk circuits for energizing a single counting circuit on a sequential basis to record each of the circuit operations.

Still another feature of this invention includes facilities responsive to the concurrent operation of a plural number of circuits to be observed for simulating in the respective timing circuits, simultaneous operation of the circuits to be observed.

A further feature of this invention includes facilities responsive to the energization of a circuit to be observed associated with a relatively longer time delay element followed by the energization of a circuit associated with a relatively shorter time delay element to provide for the recording of the circuit associated with the shorter time delay element prior to that associated with the longer time delay element.

Figure 2:
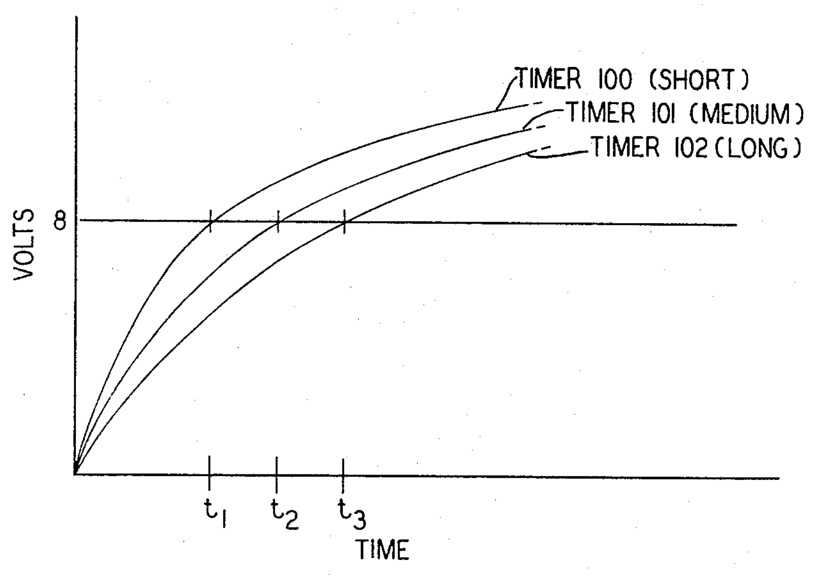
Figure 3:
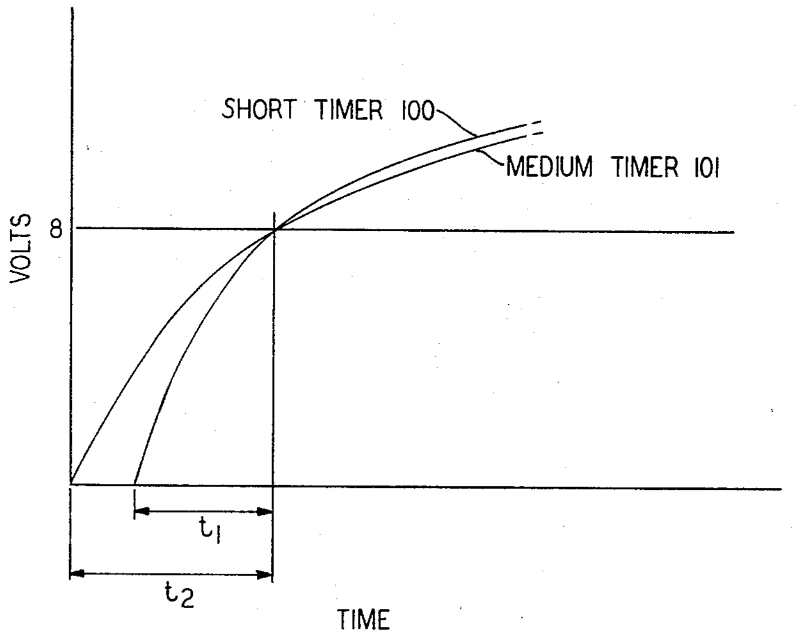

These and other objects and features of the invention may be more readily comprehended from an examination of the following specification, appended claims and attached drawing in which:

FIG. 1 shows a specific illustrative embodiment of the count totalizer in combination with a group of incoming trunk circuits which are to be observed;

FIG. 2 shows a graphical representation of the time constant characteristics for timers 100, 101, and 102 when the timers are energized precisely simultaneously; and FIG. 3 shows the time constant characteristics for timers 100 and 101 in a situation where timer 101 has operated prior to the operation of timer 100.

*Description of components*

Referring now to the drawing FIG. 1, time delay circuits 100, 101 and 102 are respectively short, medium, and long time delay circuits. The respective time delays are determined by capacitors 109, 110 and 111 and resistors R, 2R, and 3R. Contacts 103, 104 and 105 are re-respectively associated with trunk relays T1, T2 and T3 individual to the first, second, and third trunks. PNPN transistors 106, 107, and 108 are individual to each of the timing circuits and respond to the charging of the respective capacitors 109, 110, and 111 to a predetermined level sufficient to drive the PNPN transistor into a low impedance condition.

The monostable oscillator 112 includes transistors 113 and 114 which are effective when energized by an output pulse from the timing circuits over conductor 115 to generate a single pulse which momentarily activates relay CO and operates message register 116. Additional relays A1, A2, and A3 are effective in conjunction with marginal relay 117 to recycle all of the condenser timing circuits when more than one trunk relay is energized. In this respect, the operation of the marginal relay 117 opens the path to the message register at the contacts in series therewith and completes a path to operate relay CO which in turn recycles the time delay circuits as explained herein in detail.

*Description of operation in response to energization of single trunk circuit*

Assuming that the second trunk associated with timing circuit 101 is energized, trunk relay T2 is operated in a conventional manner not shown herein. In consequence, a path may be traced from positive battery, contacts of relays CO, T2, resistance 2R to the base of PNPN transistor 107 to energize transistor 107. The latter delivers a negative pulse over condenser 125, diode 126, and conductor 115 to the base of transistor 113. The latter transistor is driven to the ON condition to operate relay CO from negative battery, winding of relay CO, collector-emitter path of transistor 113, diode 127 to ground. At the same time a pulse is delivered to the base electrode of transistor 114 which was previously conducting to turn that transistor off. When the collector potential of transistor 114 is driven in the negative direction, transistor 118 turns on and provides a path for the operation of relay 116 (the counting or message register relay) over the contacts of relay 117.

The operation of relay CO permits all timing condensers 109, 110, etc., to discharge through the respective resistances 120, 121, etc.

It will be noted that initially the condenser 110 was charged over a path including the contacts of relays CO, T2, and resistance 2R until the potential of capacitor 110 was sufficient to energize transistor 107. Thereafter, the PNPN transistor 107 remains conducting until the second trunk circuit is released and relay T2 is therefore released.

When the negative pulse delivered over conductor 115 subsides, transistor 114 is again driven to the ON condition through the negative bias supplied over resistance 119, and transistor 113 returns to the OFF condition in view of the removal of the negative potential from the base electrode thereof.

When relay CO releases, in consequence of the deenergization of transistor 113, condenser 110 again begins to charge since trunk relay T2 remains closed over the path described for the original charging of condenser 110. However, transistor 107 is already conducting and, in consequence, the charging of condenser 110 does not produce any additional output pulse through condenser 125 and conductor 115. In summary, the message register relay 116 has been operated once to record the operation of the trunk relay T2.

*Description of operation in response to simultaneous or concurrent energization of trunk circuits*

References to FIGS. 2 and 3 will illustrate graphically the threat of "masking" when two or more timing circuits are operated concurrently rather than precisely simultaneously. Moreover, the advantage of restoring a "race" condition to all of the timers by simulating the precisely simultaneous energization of all the timers will be made apparent.

In FIG. 2, the time constant characteristics for timers 100, 101 and 102 are shown. It is seen that the characteristic for timer 100 which includes the lowest charging resistance attains the necessary level (8 volts) for energizing the associated PNPN transistor prior to the remaining timers. The remaining timers achieve the requisite level at times $t2$ and $t3$, respectively. In each instance, the spread between the respective times $t1$, $t2$, and $t3$ and time $t1$ are designed to exceed the operate times of relays CO, 117 and 116 by a very substantial amount and the resultant sequential operation of the respective PNPN transistors insures prevention of masking when all circuits are operated precisely simultaneously. It is significant to observe that this arrangement for intentionally simulating simultaneous operation of all timers is traditionally avoided in view of the possibility in prior circuits that simultaneous operation may induce masking and inaccurate recording as discussed above.

The typical situation in which masking might occur as the result of concurrent, but not precisely simultaneous, operation of timers 100 and 101 is shown in FIG. 3. Therein, the medium time delay device 101 is energized initially. Subsequently, during the timing cycle, but prior to the time that timer 101 has reached the requisite level to energize PNPN transistor 107, the operation of the associated trunk causes short timer 100 to become active. If timer 100 became active and a time equal to time $t2$–$t1$, both timers would achieve the 8-volt level precisely simultaneously and, in consequence, although the timers have different time constants, masking could occur since conductor 115 would receive both input pulses simultaneously. This problem is overcome by the utilization of relay 117, a marginal relay, which operates when more than one trunk relay is operated in the manned described hereinafter in detail.

It will now be assumed that trunk relay T2 is operated followed shortly thereafter by the operation of relay T1. Condenser 110 begins to charge in the manner described above, and prior to reaching a level sufficient to operate transistor 107, the contacts of relay T1 are closed permitting condenser 109 to begin charging over a similar path including resistance R. Since two trunk circuits are operated, a path is available to operate marginal relay 117 which may be traced over the contacts of relays T1, A1, R10, winding of relay 117 to negative battery. A similar parallel path is available over the contacts of relay T2 and resistance R11. The operation of relay 117 interrupts the normal scoring operation of relay 116 of the message register. Instead, a path may now be traced via resistor 151, the contacts of relay 117, and conductor 115 to the base of transistor 113 to turn that transistor on. Zener diode 127 in the base circuit of transistor 113 is utilized to limit the forward base-emitter current and to conduct sufficient current for operating relay CO. In one illustrative embodiment of this invention, a Western Electric Company coded 420M diode (8 volt Zener) may be employed as diode 127 with a 2N43 transistor as transistor 113. Transistor 114 is turned off by the positive pulse which appears at the collector electrode of transistor 113. Relay CO is operated in view of the energization of transistor 113 in the manner described above and transistor 118 is energized in view of the negative potential excursion at the collector electrode of transistor 114, also in the manner described above. However, the contacts of relay 117 in series with the winding of relay 116 prevent the latter message register relay from operating.

In the interim, the contacts of relays A1 and A2 provide locking paths for their respective relays and the path to relay 117 is opened at the contacts of relays A1 and A2. Relay 117, previously locked over the contacts of relay CO, is released in consequence of the operation of relay CO as described. Moreover, the contacts of relay CO in circuits 100 and 101 open the path to the respective charging circuits permitting condensers 109 and 110 to discharge through resistors 120 and 121, respectively.

Since resistance R is arranged to be substantially lower than resistance 2R, condenser 109 charges to the requisite level before condenser 110. In consequence, transistor 106 is energized in the manner described above for nonconcurrent operation to deliver a negative pulse over conductor 115 which turns transistor 113 on and turns transistor 114 off. Relay CO is again operated through transistor 113 and the de-energization of transistor 114 causes the energization of transistor 118. This time, however, in view of the release of transistor 117, the message register relay 116 operates to record the previous operation of trunk relay T1.

When relay CO operated, as described above, both condensers 109 and 110 again discharged through the respective parallel resistors 120 and 121. In consequence, the "race" cycle is again initiated when relay CO releases in view of the ultimate de-energization of transistor 113 when the negative pulse on conductor 115 subsides.

Thus, condensers 109 and 110 begin to charge precisely simultaneously and condenser 109 once more, in view of the lower time constant in circuit 100, charges to a level sufficient to energize transistor 106. However, the latter transistor is already energized, as described above, and consequently no output pulse is delivered over conductor 115.

Subsequently, when condenser 110 achieves the requisite level, transistor 107 is energized to deliver a pulse over condenser 125 and diode 126 to operate transistor 113 and relay CO in the manner described above. Moreover, transistor 114 is turned off and transistor 118 is energized, also in the manner described above, thereby effecting the operation of relay 116 over the contacts of relay 117 and negative battery. Thus, the message register relay 116 is operated to record the previous operation of trunk relay T2.

Again, the momentary operation of relay CO in monostable circuit 112 initiates the discharge of condensers 109 and 110 followed by another race cycle when relay CO again releases. Thus, condensers 109 and 110 charge over their respective resistances and condenser 109 achieves the required voltage level before condenser 110. However, transistor 106 is already conducting and no output is delivered over conductor 115. Moreover, since transistor 107 is also already conducting, no further output pulse is delivered from circuit 101 to conductor 115.

At this time, no further action takes place in the timing circuits until trunk relay T1 or T2 is released. The release of either relay, for example relay T1, causes the release of the respective relay A–, in this case relay A1, by opening the locking path therefore, and the extension of a path from negative battery, contacts of relays 117, T1, resistance 152 to the base electrode of transistor 106 to turn off transistor 106. A similar sequence of events takes place when trunk relay T2 is released in view of the release of its associated trunk circuit.

Thus, it is seen that although trunk relay T2, in fact, operated prior to the operation of trunk relay T1, the message register relay 116 actually records the operation of trunk relay T1 first and the operation of relay T2 last. Moreover, it is apparent that although the respective trunk relays did not operate precisely simultaneously that the circuit is arranged to provide a race condition between the timing circuits of circuit 101 and circuit 102 which simulates the simultaneous operation of trunk relays T1 and T2.

If both trunk relays T1 and T2 operate precisely simultaneously, marginal relay 117 is operated in the manner described above.

Thereafter, transistor 113 is energized over the contacts of relay 117 and relay CO is operated also in the manner described above. Subsequently, when relay CO releases, the "race" period begins again for timing circuits 100 and 101 and the procedure thereafter is similar to that described for concurrent calls.

Moreover, if trunk relay T3 had operated simultaneously or concurrently with the other two trunk relays, the operation is analogous with the exception that ultimately transistor 108 is operated and relay 116 is scored for a third time.

The circuit parameters may take the following illustrative values:

| Resistors: | Ohms |
| --- | --- |
| R | 100,000 |
| 2R | 200,000 |
| 3R | 300,000 |
| **120** | 50,000 |
| **121** | 50,000 |
| **122** | 50,000 |
| **131** | 2,700 |
| **132** | 2,700 |
| **133** | 2,700 |
| **134** | 10,000 |
| **135** | 10,000 |
| **136** | 10,000 |
| **151** | 50,000 |
| **137** | 22,000 |
| **138** | 27,000 |
| **139** | 8,000 |
| **140** | 22,000 |
| **141** | 2,000 |
| **142** | 39,000 |
| **R10** | 500 |
| **R11** | 500 |
| **R12** | 500 |
| **152** | 7,500 |
| **143** | 7,500 |
| **144** | 7,500 |

| Condensers: | Microfarad |
| --- | --- |
| **109** | 1 |
| **110** | 1 |
| **111** | 1 |
| **145** | .001 |
| **125** | .001 |
| **146** | .001 |
| **147** | 3 |

| Transistors: | |
| --- | --- |
| PNPN **106** | 27A |
| PNPN **107** | 27A |
| PNPN **108** | 27A |
| PNPN **113** | 2N43 |
| PNPN **114** | 2N43 |
| PNPN **118** | 2N43 |

It is understood that the relays other than relays T1, T2 and T3 are fast operating relays whose operating times are relatively much shorter than the timing cycles of circuits 100, 101 and 102 or the spread between the cycle times.

It is to be further understood that the above-described arrangements are illustrative of the application of the principles of the invention. Numerous other arrangements may be devised by those skilled in the art without departing from the spirit and scope of the invention.

What is claimed is:

1. A totalizer circuit including a plurality of devices to be monitored, a plurality of timing means individual to said devices and responsive to the energization of said devices, a counter responsive to the energization of said timing means, means responsive to the concurrent operation of more than one of said devices for recycling said timing means prior to the scoring of said counter, and additional means for simultaneously re-energizing said timing means to effect individual scoring of said counter in response to the energization of each of said devices.

2. A totalizer circuit including a plurality of elements to be observed, individual capacitor timing means each having differing time constants and responsive to the energization of said elements, counting means responsive to the energization of said timing means, means responsive to the concurrent operation of more than one of said elements for resetting all said timing means prior to the scoring of said counting means, and additional means for simultaneously re-energizing said timing means to effect individual scoring of said counting means in response to the concurrent energization of each of said elements.

3. A totalizer circuit for a plurality of trunk circuits to be monitored, resistor-capacitor timing means each having differing time constants individual to said circuits, means responsive to the energization of said trunk circuits to energize said respective timing means, counting means responsive to the energization of said timing means for recording the operations of said trunk circuits, means responsive to the concurrent operation of more than one of said circuits for resetting said resistor-capacitor timing means individual to said operated trunk circuits, and additional means for effecting the re-energization of said timing means simultaneously to insure sequential scoring of said counting means in response to the concurrent energization of each of said trunk circuits.

4. A totalizing circuit including a plurality of devices to be counted, individual resistance-capacitor timing means each having different time constants and responsive to the energization of said devices, counting means responsive to the energization of said timing means, marginal means responsive to the concurrent operation of more than one of said devices for inhibiting the operation of said counting means and for resetting all said timing means each having differing time constants and responsive energizing said timing means to effect individual counting of said devices in response to the concurrent energization of said devices.

5. A totalizing circuit including a plurality of circuits to be counted, individual capacitor timing means each having differing time constants and responsive to the energization of said circuits, counting means responsive to the energization of said timing means, monostable means operative responsive to the completion of a timing cycle by any of said timing means, and means responsive to the concurrent operation of more than one of said circuits for resetting said timing means individual to said operated circuits and for energizing said monostable means sequentially in accordance with the successive completion of the respective timing cycles of said individual timing means.

6. A totalizing circuit including a plurality of devices to be monitored, individual resistor-capacitor timing means each having differing time constants and responsive to the energization of said devices, register means responsive to the energization of said timing means, marginal relay means responsive to the concurrent operation of more than one of said devices for resetting all said timing means, monostable means responsive to the energization of said timing means for normally actuating said register means, and additional means responsive to the energization of said marginal relay means for inhibiting the actuation of said register means by said monostable means.

7. Totalizing means including a plurality of elements to be monitored, individual resistor-capacitor timing means each having differing time constants, transistor switching means individual to said timing means and responsive to the completion of a timing cycle by said timing means, monostable means responsive to the energization of said transistor switching means to actuate said counting means, means responsive to the concurrent operation of more than one of said timing means for resetting said timing means prior to the completion of a timing cycle by any of said timing means, and additional means for simultaneously re-energizing all said timing means to effect individual scoring of said counting means in response to the energization of each of said circuits.

8. A totalizer including a plurality of circuits to be counted, individual resistor-capacitor timing means, each having differing time constants and responsive to the energization of said circuits, counting means responsive to the energization of said timing means, means responsive to the operation of one of said timing means having a longer time delay followed by the concurrent operation of one of said timing means having a shorter time delay for resetting both said timing means prior to the termination of the timing cycle of either of said timing means, and additional means responsive to said concurrent operation of said circuits for simultaneously re-energizing both said timing means to effect the operation of said counting means in response to the operation of said timing means having a shorter time delay prior to the operation of said timing means having a longer time delay.

9. A totalizing circuit including a plurality of circuits to be counted, individual resistor-capacitor timing means each having differing time constants and responsive to the energization of said circuits, counting means, monostable means responsive to the completion of a timing cycle by said timing means for actuating said counting means, marginal relay means responsive to the concurrent operation of more than one of said circuits for actuating said monostable means to reset said timing means prior to the conclusion of the timing cycle of any of said timing means, additional means responsive to said concurrent operation of said circuits for simultaneously re-energizing said timing means at the initiation of the respective timing cycles, and means responsive to the sequential completion of said timing cycles for resetting said timing means to effect individual counting by said counting means of each of said concurrently operated circuits.

References Cited

UNITED STATES PATENTS

| | | | |
|---|---|---|---|
| 2,637,810 | 5/1953 | Moerman | 328—41 |
| 3,158,687 | 11/1964 | Long | 179—8.6 |

KATHLEEN H. CLAFFY, *Primary Examiner.*

H. ZELLER, *Assistant Examiner.*